United States Patent
Yamamoto

(10) Patent No.: US 6,923,743 B2
(45) Date of Patent: Aug. 2, 2005

(54) TOROIDAL CONTINUOUSLY VARIABLE TRANSMISSION

(75) Inventor: Takeshi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 278 days.

(21) Appl. No.: 10/392,907

(22) Filed: Mar. 21, 2003

(65) Prior Publication Data

US 2003/0203789 A1 Oct. 30, 2003

(30) Foreign Application Priority Data

Apr. 25, 2002 (JP) ....................................... 2002-123351

(51) Int. Cl.[7] ............................................. F16H 15/38
(52) U.S. Cl. .............................. 476/46; 476/45; 476/41
(58) Field of Search ............................. 476/40, 41, 45, 476/46

(56) References Cited

U.S. PATENT DOCUMENTS 6,832,971 B2 * 12/2004 Yamamoto .................. 475/217

| 2003/0104898 | A1 | * | 6/2003 | Mori | 476/46 |
| 2003/0203789 | A1 | * | 10/2003 | Yamamoto | 476/46 |
| 2004/0029675 | A1 | * | 2/2004 | Shibukawa | 476/40 |
| 2004/0209729 | A1 | * | 10/2004 | Yamamoto | 476/40 |

FOREIGN PATENT DOCUMENTS

JP         58-112762 U       8/1983

* cited by examiner

Primary Examiner—David M. Fenstermacher
(74) Attorney, Agent, or Firm—Foley & Lardner LLP

(57) ABSTRACT

In a toroidal CVT includes a power roller interposed between input and output disks under a preload, a trunnion supports the power roller to permit a tilting motion of the power roller about a trunnion axis perpendicular to a power-roller rotation axis and to permit a parallel translation of the power roller relative to the trunnion in the direction of the common rotation axis of the input and output disks. The power roller includes an inner race in contact with the input and output disks, an outer race supported by the trunnion, and a power-roller bearing permitting relative rotation of the inner race to the outer race. The outer race has a low rigidity structure that promotes a deformation of the outer race so that the outer-race deformation follows the inner-race deformation, which may occur due to the preload during operation of the toroidal CVT.

11 Claims, 11 Drawing Sheets

TOROIDAL CONTINUOUSLY VARIABLE TRANSMISSION

TECHNICAL FIELD

The present invention relates to the improvements of a power roller of a toroidal continuously variable transmission (toroidal CVT) for an automotive vehicle, and specifically to the improved power roller structure for a toroidal CVT that permits a parallel translation of the power roller relative to a trunnion in the direction of a common rotation axis of the input and output disks.

BACKGROUND ART

In recent years, to meet demands for increased shift comfort, improved driveability, and reduced fuel consumption and exhaust emissions, there have been proposed and developed toroidal continuously variable transmissions often abbreviated to "toroidal CVTs", in which a transmission ratio is steplessly variable within limits. Japanese Utility-Model Provisional Publication No. 58-112762 (hereinafter is referred to as "JU58-112762") discloses a toroidal CVT using a tapered roller bearing as a power roller bearing and also using a power roller pivot shaft as a power-roller support that permits a power-roller horizontal displacement (a displacement in the direction of the common rotation axis of the input and output disks). In the toroidal-CVT power roller disclosed in JU58-112762, each of inner and outer races of the power roller has a cylindrical bore. A needle roller bearing is interleaved between the inner periphery of the bore formed in the inner race and the outer periphery of the power roller pivot shaft. The power roller pivot shaft is press-fitted into the bore formed in the outer race.

SUMMARY OF THE INVENTION

In the toroidal-CVT power roller disclosed in JU58-112762, the outer race tightly fitted onto the power roller pivot shaft, provides a solid cross section structure. On the other hand, the inner race has a hollow cross section structure. As is generally known, for power transmission, there is a contact pressure created by axial preload or thrust or loading force, which is produced by means of a so-called loading cam device and whose magnitude is substantially proportional to input torque transmitted to the loading cam device. Engine power (torque) is transmitted from the input disk to the output disk via a traction oil film formed between the power roller and each of the input and output disks, using a shearing force in the traction oil film at high contact pressure. During operation of the toroidal CVT, the shearing force and the contact pressure are both applied via each of the input and output disks to the power-roller inner race. During application of both the shearing force and contact pressure to the power roller, there is a remarkable deformation of the inner race but less deformation of the outer race having the solid cross section structure (a high rigidity). As a result of this, the excessively large load acts on the power roller bearing (the tapered roller bearing). This results in the reduced fatigue life of the power roller bearing.

Accordingly, it is an object of the invention to provide a toroidal continuously variable transmission (a toroidal CVT) for a vehicle, which avoids the aforementioned disadvantages.

It is another object of the invention to provide an improved power roller structure for a toroidal CVT, capable of permitting a parallel translation of a power roller relative to a trunnion in a direction of a common rotation axis of input and output disks and of enhancing a fatigue life of a power roller bearing by preventing excessive load from acting on the power roller bearing.

In order to accomplish the aforementioned and other objects of the present invention, a toroidal continuously variable transmission comprises input and output disks coaxially arranged and having respective torus surfaces opposing each other, at least one power roller interposed between the opposing torus surfaces of the input and output disks under a preload, a trunnion that supports the power roller to permit a tilting motion of the power roller about a trunnion axis perpendicular to a rotation axis of the power roller and to permit a parallel translation of the power roller relative to the trunnion in a direction of a common rotation axis of the input and output disks, a loading cam device that produces the preload acting on the power roller through the input and output disks, the power roller comprising an inner race kept in contact with the input and output disks under the preload to transmit input torque from the input disk via the inner race to the output disk, an outer race supported by the trunnion, and a power-roller bearing that rotatably supports the inner race while permitting relative rotation of the inner race to the outer race, the power-roller bearing comprising at least an inner raceway surface formed on the inner race, an outer raceway surface formed on the outer race, and a plurality of rolling elements sandwiched between the inner and outer raceway surfaces, and the outer race having a low rigidity structure that promotes a deformation of the outer race so that the deformation of the outer race follows a deformation of the inner race, occurring due to the preload acting on the inner race of the power roller through the input and output disks.

The other objects and features of this invention will become understood from the following description with reference to the accompanying drawings.

DESCRIPTION OF THE PREFERRED EMBODIMENTS

Figure 1:
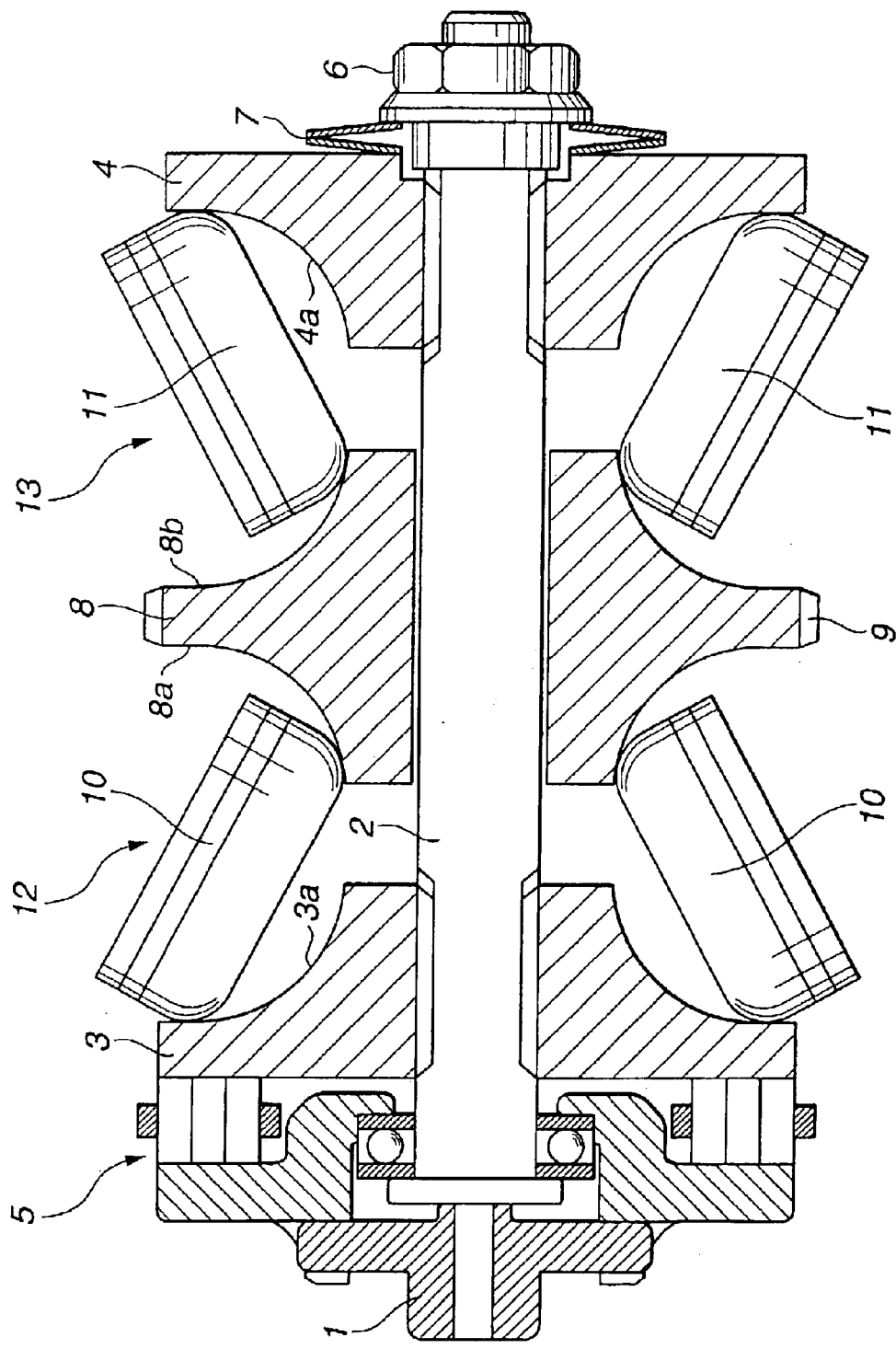
FIG. 1 is a longitudinal cross-sectional view showing a ratio change mechanism of a toroidal CVT of a first embodiment.
Figure 2:
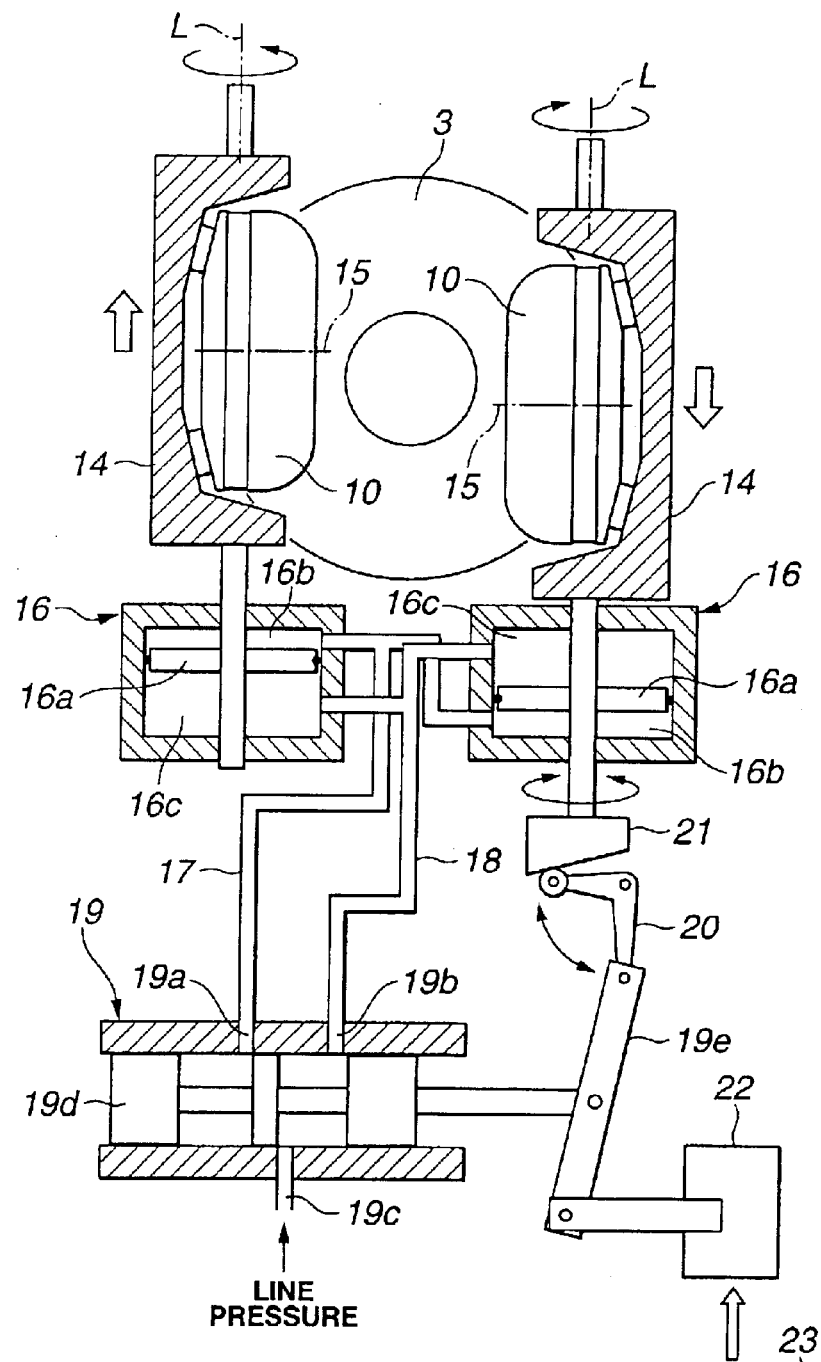
FIG. 2 is a system diagram showing a ratio change control system of the toroidal CVT of the first embodiment.

Referring now to the drawings, particularly to FIG. 1, a toroidal continuously variable transmission (toroidal CVT) of the first embodiment is exemplified in a half-toroidal continuously variable transmission. In the power train for the toroidal CVT of the embodiment shown in FIG. 1, engine torque (driving torque) is transmitted from an engine (serving as a prime mover) via a lock-up torque converter (now shown) to a forward and reverse changeover mechanism (not shown). The forward and reverse changeover mechanism (F/R changeover mechanism) functions to transmit input rotation to an input shaft 1 of the toroidal CVT without changing a direction of rotation in a drive range (D range) of a forward running mode. A torque transmission shaft 2 is coaxially arranged with input shaft 1. Each of a first input disk 3 and a second input disk 4 is supported on both ends of torque transmission shaft 2 by way of spline engagement, so as to permit each of first and second input disks 3 and 4 to axially move relative to torque transmission shaft 2, and to rotate about torque transmission shaft 2. The F/R changeover mechanism also functions to transmit input rotation to toroidal CVT input shaft 1 while changing a direction of the input rotation in a reverse range (R range). In this manner, the F/R changeover mechanism reversibly transmits the input rotation of the prime mover to the input disk. As is generally known, the F/R changeover mechanism further functions to shut off power transmission to the toroidal CVT input shaft in a parking range (P range) or a neutral range (N range). The F/R changeover mechanism is generally comprised of a planetary gearset, a forward clutch, and a reverse brake. At the subsequent stage of the F/R changeover mechanism, a front toroidal CVT mechanism (or a first variator unit) 12 and a rear toroidal CVT mechanism (or a second variator unit) 13 are set in tandem and coaxially arranged in the interior space of the toroidal CVT casing so as to construct a "dual cavity type toroidal CVT". First and second CVT mechanisms 12 and 13 are arranged in reverse to each other on torque transmission shaft 2. A loading cam device 5 is interposed between the backface of first input disk 3 and toroidal CVT input disk 1 to produce a magnitude of axial preload (thrust) substantially proportional to input torque transmitted to the loading cam device. A coned disc spring 7 is disposed between the backface of second input disk 4 and a nut 6 threadably engaged with a right-hand screw-threaded end portion of torque transmission shaft 2 so as to axially preload both of first and second input disks 3 and 4. An output disk unit 8 is loosely fitted onto the outer periphery of torque transmission shaft 2 and located midway between first and second input disks 3 and 4 such that the output disk is rotatable relative to torque transmission shaft 2. Output disk unit 8 is comprised of a first output disk portion having a torus surface or a toroidal groove 8a facing a torus surface or a toroidal groove 3a of first input disk 3, and a second output disk portion having a torus surface or a toroidal groove 8b facing a torus surface or a toroidal groove 4a of second input disk 4. That is, output disk unit 8 is constructed by integrally connecting the backface of the first output disk portion to the backface of the second output disk or by forming the first and second output disk portions integral with each other as a unit. Output disk unit 8 is formed on the outer periphery with an output gear 9. First power rollers 10, 10 are interposed between toroidal groove 3a of first input disk 3 and toroidal groove 8a of first output disk portion of output disk unit 8 opposing each other, so that first power rollers 10, 10 are in contact with toroidal grooves 3a and 8a of first input disk 3 and the first output disk portion of output disk unit 8 under axial preload so as to transmit engine power (input torque) from first input disk 3 to the first output disk portion via a traction oil film formed between each first power roller 10 and each of first input disk 3 and the first output disk portion, using a shearing force in the traction oil film at high contact pressure. First power rollers 10, 10 are symmetrically arranged to each other with respect to the axis of torque transmission shaft 2, that is, a common rotation axis of the input and output disks coaxially arranged with and opposed to each other. In the same manner, second power rollers 11, 11 are interposed between toroidal groove 4a of second input disk 4 and toroidal groove 8b of second output disk portion of output disk unit 8 opposing each other, so that second power rollers 11, 11 are in contact with toroidal grooves 4a and 8b of second input disk 4 and the second output disk portion of output disk unit 8 under axial preload so as to transmit engine power from second input disk 4 to the second output disk portion via a traction oil film formed between each second power roller 11 and each of second input disk 4 and the second output disk portion, using a shearing force in the traction oil film at high contact pressure. Second power rollers 11, 11 are symmetrically arranged to each other with respect to the common rotation axis of the input and output disks. First and second toroidal CVT mechanisms 12 and 13 have almost the same in construction. First toroidal CVT mechanism 12 is comprised of first input disk 3, the first output disk portion of output disk unit 8 coaxially arranged and opposing each other, first power rollers 10, 10, power roller supports or trunnions 14, 14 (described later), and servo pistons 16, 16 (described later) each serving as a hydraulic actuator. On the other hand, second toroidal CVT mechanism 13 is comprised of second input disk 4, the second output disk portion of output disk unit 8 coaxially arranged and opposing each other, second power rollers 11, 11, power roller supports or trunnions 14, 14 (described later), and servo pistons 16, 16 (described later) each serving as a hydraulic actuator. The details of the ratio change control system of the toroidal CVT of the first embodiment are described hereunder in reference to the system diagram of FIG. 2 showing the control system associated with first toroidal CVT mechanism 12.

Each of first and second power rollers 10, 10, 11, 11 is supported on one end of each of trunnions 14, 14, 14, 14. Power rollers 10, 10, 11, 11 are rotatable about the respective power-roller rotation axes 15, 15, 15, 15. Each of hydraulic servo pistons 16, 16, 16, 16, serving as a hydraulic servo mechanism, is coaxially connected onto the other end of each of the trunnions, so as to tilt each of the power rollers by shifting trunnions 14, 14 of first toroidal CVT mechanism 12 in opposite directions of their trunnion axes L, L perpendicular to the power-roller rotation axes and by shifting trunnions 14, 14 of second toroidal CVT mechanism 13 in opposite directions of their trunnion axes L, L perpendicular to the power-roller rotation axes, such that a pair of trunnions 14, 14 are offset to each other. That is, all of the trunnions are shifted in phase and synchronously with each other by means of the four servo pistons. For such synchronous motion of four trunnions 14, 14, 14, 14, the four trunnions are mechanically linked to each other by means of a synchronous wire. As clearly shown in FIG. 2, as a hydraulic control system for motion control of servo pistons 16, 16, a ratio-change-to-high hydraulic circuit 17, a ratio-change-to-low hydraulic circuit 18, and a ratio control valve 19 are provided. As can be seen in FIG. 2, each of two hydraulic servo pistons 16, 16 associated with first toroidal CVT mechanism 12 has a piston 16a that divides an internal space of the servo piston into a ratio-change-to-high hydraulic pressure chamber 16b and a ratio-change-to-low hydraulic pressure chamber 16c. Ratio-change-to-high hydraulic circuit 17 (hereinafter is referred to as "first hydraulic circuit") is connected to ratio-change-to-high hydraulic pressure chambers 16b, 16b of two hydraulic servo pistons 16, 16 associated with first toroidal CVT mechanism 12. In contrast, ratio-change-to-low hydraulic circuit 18 (hereinafter is referred to as "second hydraulic circuit") is connected to ratio-change-to-low hydraulic pressure chambers 16c, 16c of two hydraulic servo pistons 16, 16 associated with first toroidal CVT mechanism 12. Ratio control valve 19 has a port 19a connected to first hydraulic circuit 17 and a port 19b connected to second hydraulic circuit 18. A line pressure is supplied from a hydraulic pressure source, including an oil pump (not shown) and a relief valve (not shown), into a line-pressure port 19c of ratio control valve 19. A spool 19d of ratio control valve 19 serves to detect the direction of axial motion of each of trunnions 14, 14 and the direction of tilting motion of each of trunnions 14, 14. Ratio control valve 19 further includes an I-shaped link lever 19e whose central portion is mechanically linked or pin-connected to spool 19d, so that both the direction of axial motion and the direction of tilting motion of trunnion 14 are mechanically fed back to ratio control valve 19, and thus a degree of progress for transmission-ratio changing is mechanically fed back to the hydraulic servo mechanism, that is, the hydraulic servo pistons by means of a feedback mechanism including an L-shaped link lever 20 and a precision cam 21. Concretely, one end of I-shaped link lever 19e is linked or pin-connected to the front end of a motor driven shaft of a step motor 22 in such a manner as to create a displacement of the one end of I-shaped link lever 19e in an axial direction of spool 19d. That is, spool 19d can be axially moved by means of step motor 22. There is a one-to-one correspondence between the displacement of the one end of I-shaped link lever 19e and the ratio command signal value (the desired transmission ratio). The other end of I-shaped link lever 19e is linked or pin-connected to precision cam 21 via L-shaped link 20 in operative engagement with the cam profile of precision cam 21. The precision cam is linked to the trunnion shaft of trunnion 14 so as to transmit axial motion of the trunnion to I-shaped link lever 19e and to feedback the gyration angle of power roller 10 to the I-shaped link lever. In the forward running mode, for example in the D range, the degree of progress for ratio changing is mechanically fed back to the hydraulic servo mechanism via the precision cam. Step motor 22 is controlled in response to a control signal from an electronic CVT control unit 23. CVT control unit 23 (CVT controller) generally comprises a microcomputer. CVT control unit 23 includes an input/output interface (I/O), memories (RAM, ROM), and a microprocessor or a central processing unit (CPU). The input/output interface (I/O) of CVT control unit 23 receives input information from various engine/vehicle switches and sensors, namely a throttle opening sensor 24, an engine speed sensor 25, an input disk speed sensor 26, an output shaft speed sensor 27, an inhibitor switch 28, and an oil temperature sensor 29. Within CVT control unit 23, the central processing unit (CPU) allows the access by the I/O interface of input informational data signals from the previously-discussed engine/vehicle switches and sensors. The CPU of CVT control unit 23 is responsible for carrying the toroidal CVT ratio change control program stored in memories and is capable of performing necessary arithmetic and logic operations for the toroidal CVT ratio change control. Computational results (arithmetic calculation results), that is, a calculated output signal (a control signal) is relayed via the output interface circuitry of the CVT control unit to an output stage, namely step motor 22.

Figure 3:
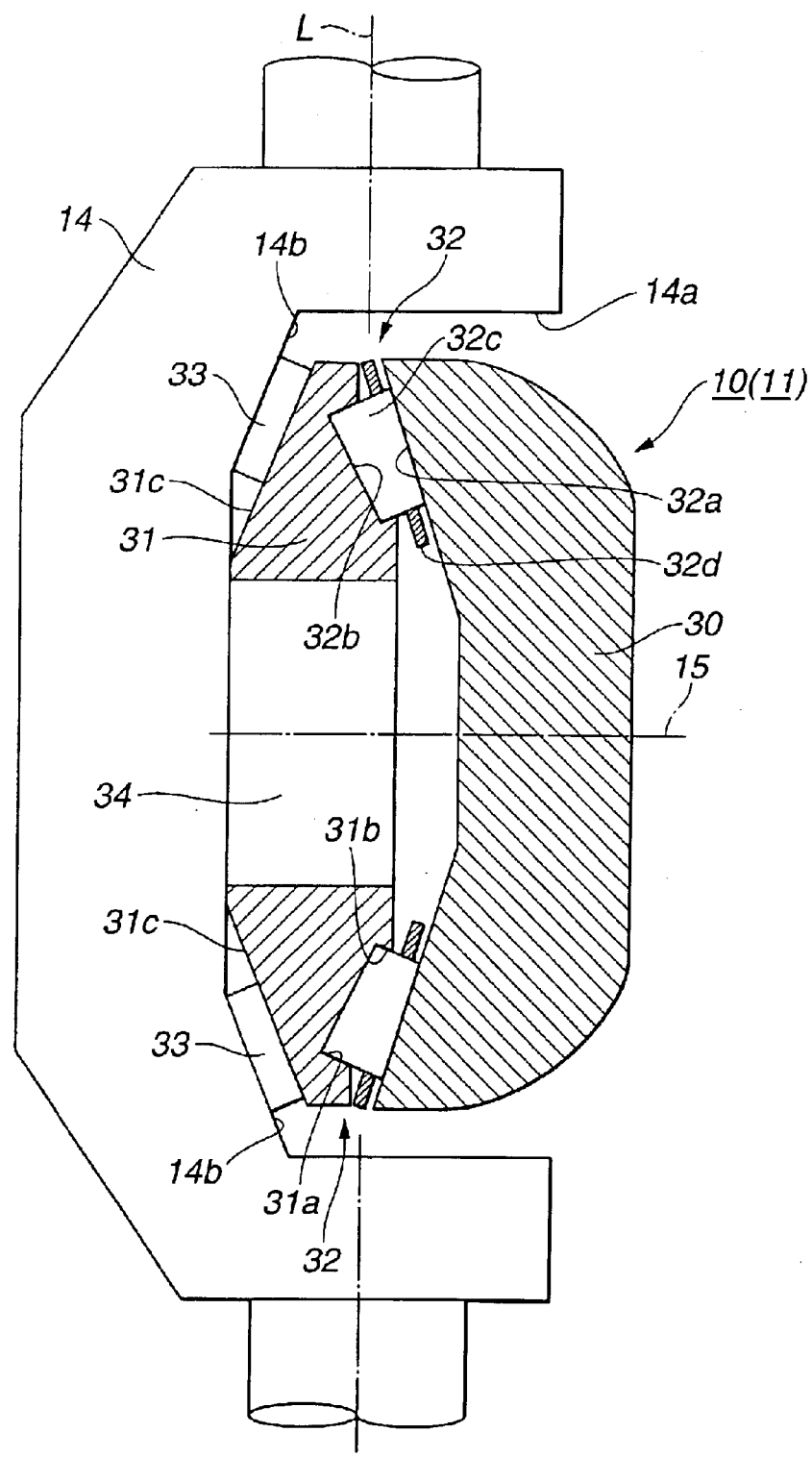
FIG. 3 is a longitudinal cross-sectional view showing a trunnion and a power roller both incorporated in the toroidal CVT of the first embodiment.
Figure 4:
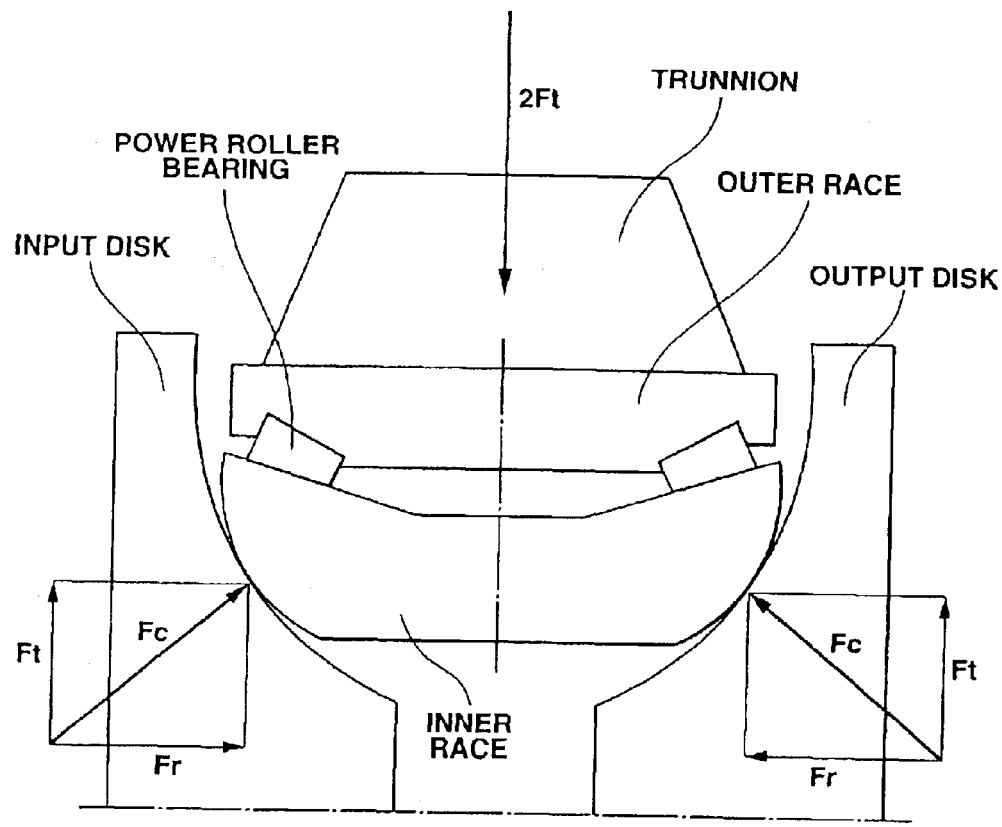
FIG. 4 is an explanatory drawing showing vector analysis for applied forces Fc, Ft, Fr acting on the inner race of the power roller of a toroidal CVT of a comparative example in which the outer race has a solid cross section structure.

Referring now to FIG. 3, there is shown the detailed structure of each trunnion (14) and power roller (10, 10, 11, 11) used for the toroidal CVT of the first embodiment.

Power roller 10 is comprised of an inner race 30, an outer race 31, and a tapered roller bearing 32. Inner race 30 serves to transmit the power input to first input disk 3 into the first output disk portion of output disk unit 8 via a traction oil film formed between power roller 10 and each of the first input and output disks, using a shearing force in the traction oil film at high contact pressure. In the shown embodiment, inner race 30 has a solid cross section structure capable of effectively suppressing the deformation of inner race 30, which may occur owing to the applied forces, that is, the shearing force and the contact pressure both applied via each of input and output disks 3 and 8 to the power-roller inner race during operation of the toroidal CVT. Herein, the solid cross section structure of inner race 30 generally means a solid inner-race component part without separation. Broadly speaking, note that the solid cross section structure of inner race 30 includes a bored, recessed or concave inner-race component part that a shaft portion or a convex portion is tightly fitted into the bored, recessed or concave portion to form a composite inner-race part after assembling. Outer race 31 of power roller 10 (11) is slidably supported on the associated trunnion 14 via a pair of thrust bearings 33, 33 in such a manner as to be able to reciprocate within limits in the direction of the common rotation axis of input and output disks 3 and 8. As clearly seen in FIG. 3, the power-roller support portion or the power-roller accommodating portion 14a of trunnion 14 has a substantially C-shaped cross section. Upper and lower corner portions of power-roller accommodating portion 14a have respective inclined power-roller supporting faces 14b, 14b. Thrust bearings 33, 33 are attached onto the respective inclined power-roller supporting faces 14b, 14b having the same inclined angle but different sense. In other words, the thrust bearing pair (33, 33) serves as a linear bearing pair (or a linear bearing unit) disposed between the inner periphery (the inclined power-roller supporting face pair 14b, 14b) of power-roller accommodating portion 14a and the power-roller outer race, in a manner so as to permit a parallel translation of the power roller in the horizontal direction (in the direction of the common rotation axis of input and output disks 3 and 8) relative to the trunnion. As can be seen in FIG. 3, upper and lower thrust bearings 33, 33 are located parallel to the common rotation axis of input and output disks 3 and 8, and laid out symmetrically with respect to a rotation axis 15 of the power roller so that thrust bearings 33, 33 are equidistant spaced to each other. On the other hand, tapered roller bearing 32 is a power-roller bearing that rotatably supports inner race 30, while permitting relative rotation of inner race 30 to outer race 31. As shown in FIG. 3, tapered roller bearing 32 is comprised of an inner raceway surface 32a formed as a recessed frusto-conical shaped surface on inner race 30, an outer raceway surface 32b formed on outer race 31, a plurality of tapered rollers (rolling elements) 32c each having a frusto-conical shape in axial cross section and sandwiched between inner and outer raceway surfaces 32a and 32b, and a cage 32d that retains tapered rollers 32c while permitting rotation of each tapered roller 32c about its rotation axis. The outer peripheral portion of outer raceway surface 32b of outer race 31 is formed with a collared portion 31a that guides the outside large-diameter end face of each tapered roller 32c. In a similar manner, the inner peripheral portion of outer raceway surface 32b is also formed with a collared portion 31b that guides the inside small-diameter end face of each tapered roller 32c. As can be seen from the cross section of the power-roller outer race 31 shown in FIG. 3, outer race 31 has an upper inclined backface 31c opposing the upper inclined power-roller supporting face 14b while sandwiching thrust bearing 33 therebetween, so that upper inclined backface 31c is arranged parallel to the upper inclined power-roller supporting face 14b. In a similar manner, outer race 31 has a lower inclined backface 31c opposing the lower inclined power-roller supporting face 14b while sandwiching thrust bearing 33 therebetween, so that lower inclined backface 31c is arranged parallel to the lower inclined power-roller supporting face 14b. Note that, in the power roller incorporated in the toroidal CVT of the first embodiment, outer race 31 is formed with a through opening (or a hollow portion, exactly, a central cylindrical bore) 34 that is located at a position corresponding to the power-roller rotation axis 15 and functions as a low rigidity structure. The low rigidity structure (through opening 34) acts to promote a deformation of outer race 31 so that the deformation of outer race 31 follows the deformation of inner race 30, which may occur owing to the applied forces transferred from input and output disks 3 and 8 to the power-roller inner race.

With the previously-discussed power roller structure, the toroidal CVT of the first embodiment operates as follows.

For the purpose of the ratio changing control of the toroidal CVT, CVT control unit 23 operates to shift trunnions 14, 14 in two opposite directions (upward and downward directions in FIG. 2) of their trunnion axes. As a result, each of power rollers 10, 10 is tilted. More concretely, step motor 22 rotates in response to a ratio command signal (corresponding to a desired transmission ratio) from CVT control unit 23, thereby causing an axial displacement of spool 19d of ratio control valve 19. Thus, working oil is introduced into one of servo piston chambers (ratio-change-to-high hydraulic pressure chamber 16b and ratio-change-to-low hydraulic pressure chamber 16c) of each servo pistons 16, 16 associated with trunnions 14, 14 of power rollers 10, 10. At the same time, the working oil is drained from the other of servo piston chambers (ratio-change-to-high hydraulic pressure chamber 16b and ratio-change-to-low hydraulic pressure chamber 16c) of each servo piston 16. As a consequence, trunnions 14, 14 are shifted in the two opposite directions of their trunnion axes, and therefore power rollers 10, 10 are shifted from their neutral positions in phase and in synchronization with each other in directions of trunnion axes perpendicular to power-roller rotation axes 15, 15. The neutral position corresponds to a non-ratio-changing position at which the power-roller rotation axis 15 intersects the common rotation axis of the input and output disks. Shifting power rollers 10, 10 from their neutral positions causes an offset (a vertical displacement) of each of power-roller rotation axes 15, 15 from the common rotation axis of the input and output disks. Owing to the offset or vertical displacement of each of power-roller rotation axis 15, 15, a side slip force occurs in a very limited contact zone between each of power rollers 10, 10 and the associated input and output disks 3 and 8. By virtue of the aforesaid side slip forces, the power rollers can be self-tilted or self-inclined in phase and in synchronization about the respective trunnion axes. Due to the self-inclining motion of each of the power rollers, a first diameter of a circular-arc shaped locus drawn by movement of the very limited contact point P between each of the power rollers and the output disk on the torus surface of the output disk and a second diameter of a circular-arc shaped locus drawn by movement of the very limited contact point P between each of the power rollers and the input disk on the torus surface of the input disk, that is, a ratio of the first diameter to the second diameter can be continuously varied, thus continuously varying a transmission ratio of the dual cavity type toroidal CVT. The previously-discussed self-tilting motion of each power roller, or the offset of each power-roller rotation axis 15, in other words, a degree of progress for transmission-ratio changing is mechanically fed back to the hydraulic servo mechanism, that is, servo pistons 16, 16 via spool 19d of ratio control valve 19 by means of precision cam 21 (exactly, a forward precision cam in the forward running mode) and L-shaped link lever 20 and by means of precision cam 21 (exactly, a reverse precision cam in the reverse running mode), such that each of the trunnions gradually returns to its initial position as the ratio changing progresses or advances. At this time, the actual axial position of spool 19d is determined depending on both the degree of progress for transmission-ratio changing mechanically fed back to the other end of I-shaped link lever 19e and the shifting amount of the one end of I-shaped link lever 19e shifted responsively to the ratio command signal by step motor 22. As soon as the gyration angle based on the desired transmission ratio corresponding to a transmission-ratio command signal value has been reached, the offset or vertical displacement of each of the trunnions is returned to zero, so as to stop the inclining motion of each power roller, and to attain the return of each power roller to neutral, and thus to maintain the desired transmission ratio corresponding to the ratio command signal value. The transmission ratio is determined depending on the tilting angle of each of power rollers 10, 10, 11, 11.

Figure 5:
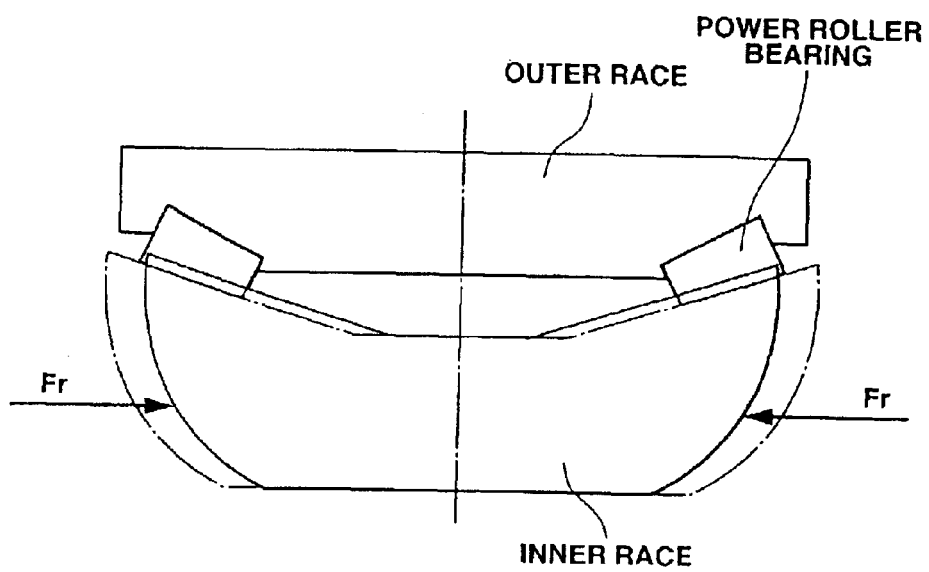
FIG. 5 is an explanatory drawing showing a state of deformation of the power-roller inner race, occurring due to a radial component Fr of a first contact pressure Fc applied via the input disk to the inner race and a radial component Fr of a second contact pressure Fc applied via the output disk to the inner race, in case of the comparative example of FIG. 4 in which the outer race has the solid cross section structure.
Figure 6:
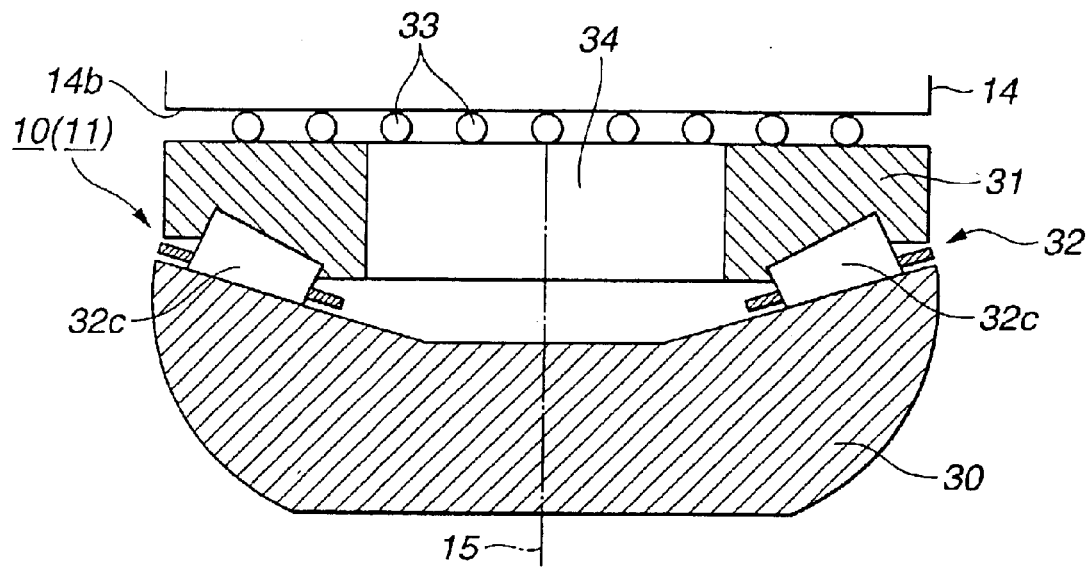
FIG. 6 is a lateral cross-section of the power roller of the first embodiment in which the outer race has a low rigidity structure.
Figure 7:
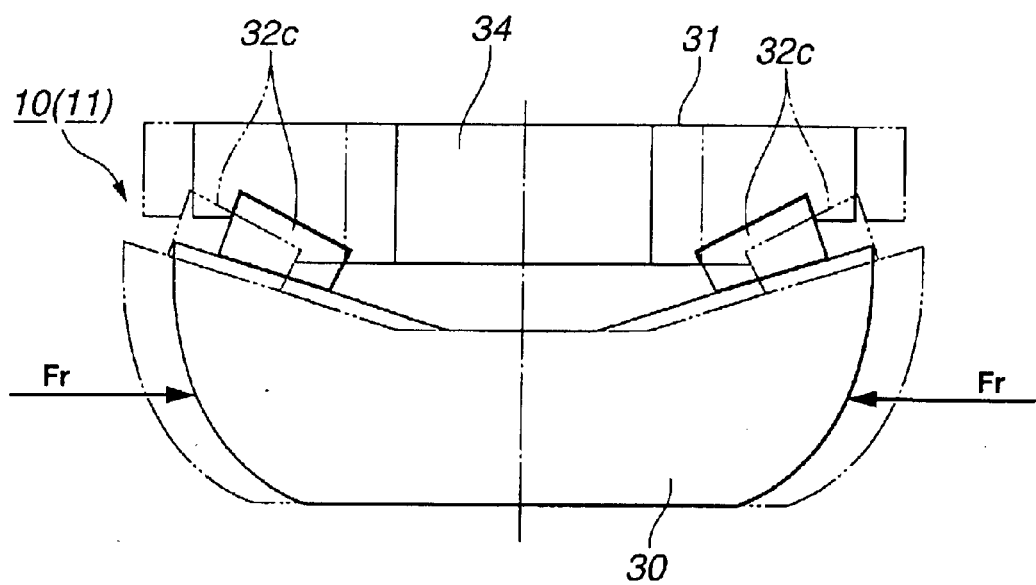
FIG. 7 is an explanatory drawing showing a state of deformation of each of the power-roller inner and outer races, occurring due to a radial component Fr of a first contact pressure applied via the input disk to the inner race and a radial component Fr of a second contact pressure applied via the output disk to the inner race, in case of the first embodiment of FIG. 6 in which the outer race has the low rigidity structure.

As hereunder described in detail in reference to FIGS. 4 through 7, there is a remarkable difference between (i) a characteristic of the load acting on each roller of the tapered roller bearing of the comparative example in which the outer race has a solid cross section structure (see FIGS. 4 and 5) and (ii) a characteristic of the load acting on each roller 32c of tapered roller bearing 32 of the first embodiment in which outer race 31 has a low rigidity structure, i.e., through opening 34 (see FIGS. 6 and 7). As can be appreciated from vector analyses shown in FIGS. 4, 5, and 7, in particular FIG. 4, a pair of contact pressures Fc, Fc is applied to each power roller via each of input and output disks, since the power rollers are in contact with the toroidal grooves (torus surfaces) of the associated input and output disks under axial preload produced by the loading cam device so as to transmit engine power from the input disk to the output disk via a traction oil film formed between each of the power rollers and each of the input and output disks, using a shearing force in the traction oil film at high contact pressure. From the parallelogram law, each contact pressure Fc is resolved into a radial component Fr along the common rotation axis of the input and output disks and an axial component Ft along the rotation axis of the power roller. An axial component Ft of the first contact pressure Fc applied via the input disk to the power-roller inner race and an axial component Ft of the second contact pressure Fc applied via the output disk to the power-roller inner race have the same magnitude and the same sense. The two axial components Ft, Ft are transmitted via the power-roller bearing (the tapered roller bearing) and the power-roller outer race to the trunnion, and thus supported by the trunnion (see the force 2Ft acting on the trunnion in FIG. 4). On the other hand, a radial component Fr of the first contact pressure Fc applied via the input disk to the power-roller inner race and a radial component Fr of the second contact pressure Fc applied via the output disk to the power-roller inner race have the same magnitude but different sense. As best seen in FIG. 5, owing to the applied radial force pair, that is, radial components Fr, Fr, the power-roller inner race tends to deform radially inwards, and thus a first inner race diameter, measured in a line-segment direction of the line segment between and including the two very limited contact points of the power-roller inner race in contact with both the input and output disks, somewhat reduces. In other words, a second inner race diameter, measured in the direction normal to the line-segment direction, tends to somewhat increase. In this manner, owing to radial components Fr, Fr, the power-roller inner race tends to elliptically deform. As a result, the rolling elements (tapered rollers) of the power-roller bearing may be put between the inner raceway surface and the outer raceway surface under high pressure. That is, radial components Fr, Fr, having the same magnitude but different sense, cannot be cancelled by only the deformation of the inner race. A part of radial force components Fr, Fr has to be absorbed or supported by the power-roller bearing. In case of the comparative example whose power-roller outer race has a solid cross section structure shown in FIGS. 4 and 5, the outer race has a high rigidity. Even when the radial component pair Fr, Fr acts on the inner race, there is a less deformation of the outer race itself, because of the high rigidity outer race. During operation of the toroidal CVT, there is an increased tendency for the excessive load to act on the power-roller bearing. This lowers the fatigue life of the power roller bearing. To avoid this, suppose that the outer race is made of a low Young's modulus material, such as aluminum alloy, copper alloy, synthetic resin or the like, instead of using a high Young's modulus material, such as steel. Such a low Young's modulus material contributes to a reduced rigidity of the outer race. However, the low Young's modulus material, for example, aluminum alloy, copper alloy, synthetic resin or the like, is inferior to the high Young's modulus material, for example steel, in durability. Actually, the bearing pressure between the rolling element (tapered roller) and the raceway surface reaches a pressure level of several GPa. The low Young's modulus material, for example, aluminum alloy, copper alloy, synthetic resin or the like, is unable to bear the excessively high bearing pressure. That is, it is difficult to solve the problem of the lowered power-roller bearing fatigue life by changing from the high Young's modulus material, e.g., steel, to the low Young's modulus material, e.g., aluminum alloy, copper alloy, synthetic resin or the like. On the contrary, in the improved power roller incorporated in the toroidal CVT of the first embodiment, as clearly shown in FIGS. 6 and 7, through opening 34 is bored in outer race 31 at the position corresponding to the power-roller rotation axis 15. Through opening 34 serves as a low rigidity structure that promotes a deformation of outer race 31 so that the deformation of outer race 31 follows the deformation of inner race 30, which may occur owing to the applied forces transferred from input and output disks 3 and 8 to the power-roller inner race. When the power-roller inner race elliptically deforms during application of a pair of radial force components Fr, Fr, outer race 31 is able to rapidly deform responsively to the deformation of inner race 30, since the rigidity of outer race 31 is tuned to a properly low rigidity by way of the centrally bored through opening 34. The rapid and proper deformation of outer race 31 following the deformation of inner race 30, avoids the excessive load from being applied to each rolling element (tapered roller 32c) sandwiched between inner and outer raceway surfaces 32a and 32b. This enhances the fatigue life of power roller bearing 32.

Figure 8A:
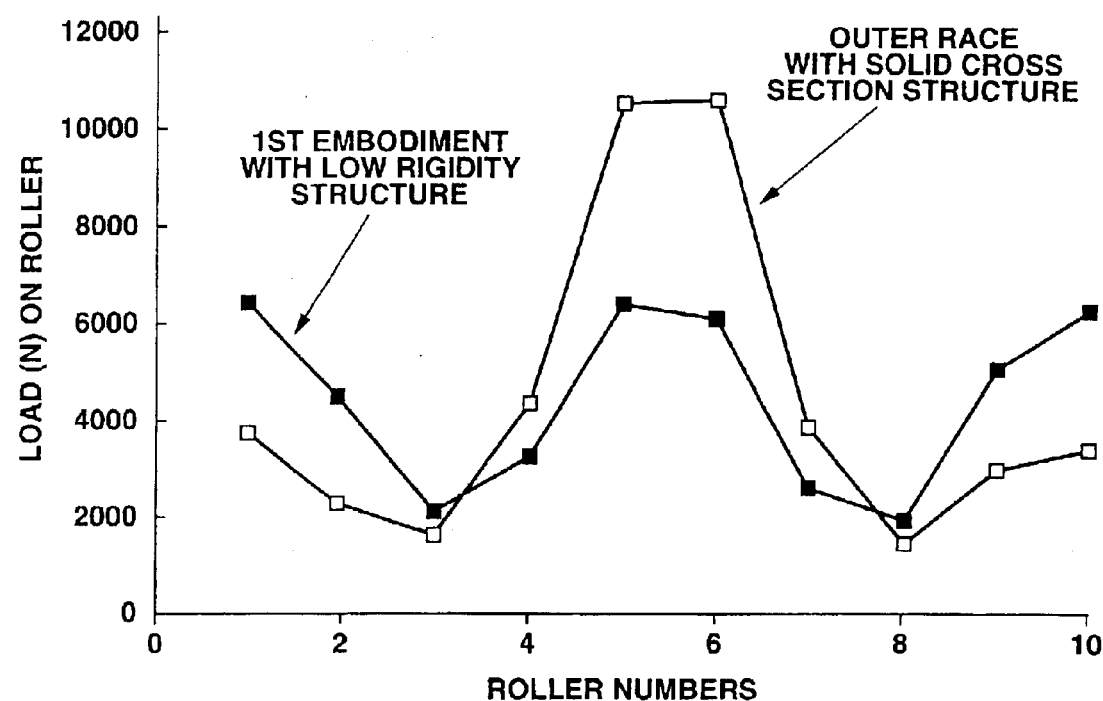
FIG. 8A is a comparative analysis diagram between the load acting on each of 1st to 10th tapered rollers of the tapered roller bearing of the power roller of the first embodiment of FIGS. 6 and 7 in which the outer race has the low rigidity structure and the load acting on each of 1st to 10th tapered rollers of the tapered roller bearing of the power roller of the comparative example of FIG. 4 in which the outer race has the solid cross section structure.
Figure 8B:
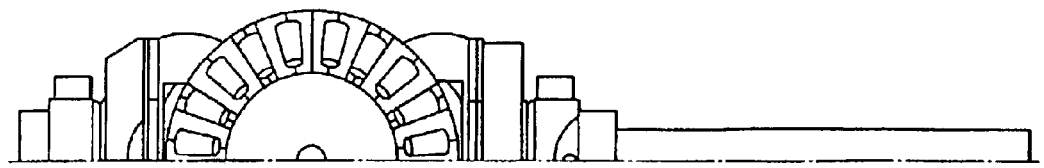
FIG. 8B is a half view showing a model for a finite element method, used for calculating the load acting on each of 1st to 10th tapered rollers of the power-roller bearing.

Referring now to FIGS. 8A and 8B, there are shown comparison results between (i) the first characteristic (plotted by the black square in FIG. 8A) of the load acting on each roller of the tapered roller bearing of the comparative example that the outer race has the solid cross section structure (see FIGS. 4 and 5) and (ii) the second characteristic (plotted by the voided square in FIG. 8A) of the load acting on each roller 32c of tapered roller bearing 32 of the first embodiment that outer race 31 has the low rigidity structure, i.e., through opening 34 (see FIGS. 6 and 7). Each of the load characteristics are calculated by way of the finite element method for the model shown in the half view of FIG. 8B in which the number of tapered rollers, circumferentially equi-distant spaced to each other, is "10". As seen from the second roller-load characteristic (plotted by the voided square in FIG. 8A) of the comparative example, that is, in case of the power-roller outer race having the solid cross section structure, the minimum load is approximately 1700 N, whereas the maximum load is approximately 11000 N. The load difference between the maximum and minimum loads is 9300 N. On the other hand, as seen from the first roller-load characteristic (plotted by the black square in FIG. 8A), that is, in case of the power-roller outer race having the low rigidity structure, the minimum load is approximately 2000 N, whereas the maximum load is approximately 6500 N. The load difference between the maximum and minimum loads is 4500 N. As discussed above, by using the low rigidity structure instead of the solid cross section structure, it is possible to reduce the load difference from 9300 N to 4500 N. That is, forming through opening 34 (the low rigidity structure) in outer race 31, contributes to equalization of loads on rolling elements (tapered rollers 32c) of tapered roller bearing (power-roller bearing) 32. Additionally, by way of the use of the low rigidity structure (through opening 34), it is possible to remarkably reduce the maximum load from approximately 11000 N to approximately 6500 N.

As set forth above, the power roller structure of the toroidal CVT of the first embodiment can provide the following effects.

(I) In the toroidal CVT having tapered roller bearing 32 (the power-roller bearing) with tapered rollers 32c each sandwiched between inner raceway surface 32a and outer raceway surface 32b, outer race 31 is formed with through opening (central bore) 34 that is located at the position corresponding to the power-roller rotation axis 15 and serves as the low rigidity structure that promotes the deformation of outer race 31 following the deformation of inner race 30, occurring owing to the applied forces Fc, Fc from input and output disks 3 and 8 to inner race 30. By virtue of the low rigidity structure (through opening 34 centrally bored in outer race 31) that permits the reasonable deformation of outer race 31 following the deformation of inner race 30, which may occur owing to the applied forces Fc, Fc, it is possible to prevent an excessive load from acting on tapered roller bearing 32, thus enhancing the fatigue life of tapered roller bearing 32.

(II) The low rigidity structure of outer race 31 is formed as a through opening 34 that is simply centrally bored in the central portion of outer race 31. Such a low rigidity structure (through opening 34) can be easily provided by simply boring the central portion of outer race 31, while using high Young's modulus material, such as steel. Such machining is very easy. This enhances the productivity of outer race 31 having a properly low rigid structure.

(III) In contrast with outer race 31 having the low rigidity structure, inner race 30 has the solid cross section structure by way of which the radial deformation of inner race 30 can be effectively suppressed even when the shearing force and the contact pressure pair Fc, Fc are applied via input and output disks 3 and 8 to power-roller inner race 30 during operation of the toroidal CVT. By the synergistic effect of the low deformability of inner race 30 and the high deformability of outer race 31, it is possible to effectively prevent the excessive load from being applied to tapered roller bearing 32, thereby increasing the life of the power roller bearing (tapered roller bearing 32).

(IV) Power-roller outer race 31 is slidably supported on the associated trunnion 14 via thrust bearing pair 33, 33 in such a manner as to be able to reciprocate with respect to the inclined power-roller supporting face pair 14b, 14b within limits in the direction of the common rotation axis of input and output disks 3 and 8. Therefore, in the presence of a change in the distance between input and output disks 3 and 8 during the ratio change control or owing to each variator unit's individual assembling errors, the thrust bearing pair 33, 33 permits a smooth parallel translation of the power-roller outer race in the direction of the common rotation axis of input and output disks 3 and 8 relative to the trunnion without any displacement of the power-roller outer race in the direction of trunnion axis L that is perpendicular to the power-roller rotation axis 15. Thus, the first axial component Ft of the first contact pressure Fc applied via the input disk to the power-roller inner race and the second axial component Ft of the second contact pressure Fc applied via the output disk to the power-roller inner race, having the same magnitude and the same sense, can be effectively received via the thrust bearing pair 33, 33 by trunnion 14.

Figure 9:
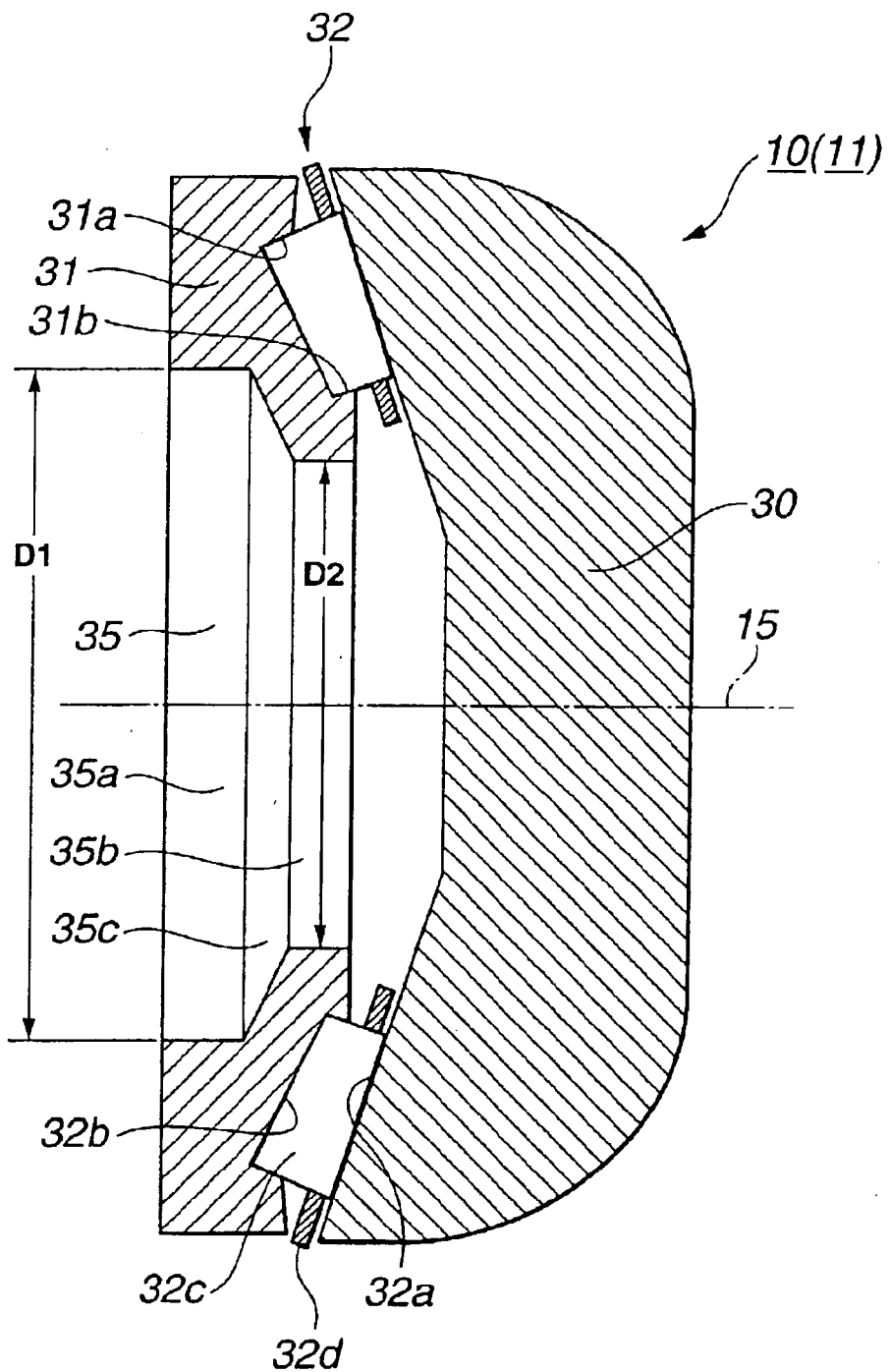
FIG. 9 is a cross section of a power roller incorporated in a toroidal CVT of a second embodiment.

Referring now to FIG. 9, there is shown the detailed cross section of the power roller incorporated in the toroidal CVT of the second embodiment. Outer-race through opening 34 of the power roller of the toroidal CVT of the first embodiment shown in FIG. 3 is formed as a cylindrical bore. The second embodiment of FIG. 9 is different from the first embodiment of FIG. 3, in that a through opening, centrally formed in outer race 31 of the power roller of the toroidal CVT of the second embodiment is formed as a stepped through opening 35 that serves as a hollow portion that permits the reasonable deformation of outer race 31 following the deformation of inner race 30, which may occur owing to the applied forces Fc, Fc. As clearly shown in FIG. 9, stepped through opening 35 is comprised of (i) a large-diameter through-opening portion 35a (an axially-leftward through-opening or cylindrical-bore portion in FIG. 9) that faces the trunnion and has a relatively larger diameter D1, (ii) a small-diameter through-opening portion 35b (an axially-rightward through-opening or cylindrical-bore portion in FIG. 9) that faces the inner race and has a relatively smaller diameter D2, and (iii) an intermediate tapered, interconnecting through-opening portion 35c by which large-diameter through-opening portion 35a and small-diameter through-opening portion 35b are interconnected. Briefly speaking, stepped through opening 35, formed in outer race 31 of the power roller of the toroidal CVT of the second embodiment is superior to through opening 34 (the cylindrical bore), formed in outer race 31 of the power roller of the toroidal CVT of the first embodiment, in increased spatial capacity and properly reduced rigidity structure. In more detail, as seen from the cross section of FIG. 9, the diameter of the axially-rightward outer-race through opening portion (small-diameter cylindrical-bore portion 35b) facing inner race 30 is limited by the inside diameter of circumferentially equi-distant spaced tapered rollers 32c located on outer raceway surface 32b facing the inner raceway surface. On the contrary, the axially-leftward outer-race through opening portion (large-diameter cylindrical-bore portion 35a) facing trunnion 14 does not have any raceway for tapered rollers 32c and thus the diameter of large-diameter cylindrical-bore portion 35a can be enlarged, so that large-diameter cylindrical-bore portion 35a somewhat overlaps but non-intersective with tapered rollers 32c. Therefore, forming stepped through opening 35 in outer race 31 is advantageous with respect to properly increased spatial capacity. Instead of forming stepped through opening 35 by large-diameter and small-diameter cylindrical bores 35a, 35b, and intermediate tapered through opening 35c, stepped through opening 35 of the second embodiment of FIG. 9 may be formed as a two-stepped through opening that is comprised of large-diameter and small-diameter cylindrical bores 35a and 35b located adjacent to each other without intermediate tapered through opening 35c. As set forth above, the power roller structure of the toroidal CVT of the second embodiment can further provide the following effect (V) in addition to the previously-discussed effects (I) to (III), obtained by the first embodiment.

(V) The low rigidity structure of outer race 31 is formed as a stepped through opening 35 that is comprised of large-diameter through-opening portion 35a facing trunnion 14 and having the relatively larger diameter D1, small-diameter through-opening portion 35b facing inner race 30 and having the relatively smaller diameter D2, and intermediate tapered through-opening portion 35c. The spatial capacity of the outer-race through opening can be properly enlarged. Owing to the properly enlarged spatial capacity of outer-race through opening 35, the rigidity of the power-roller outer race of the toroidal CVT of the second embodiment shown in FIG. 9 can be further reduced as compared to the rigidity of the power-roller outer race of the toroidal CVT of the first embodiment shown in FIG. 3.

Figure 10:
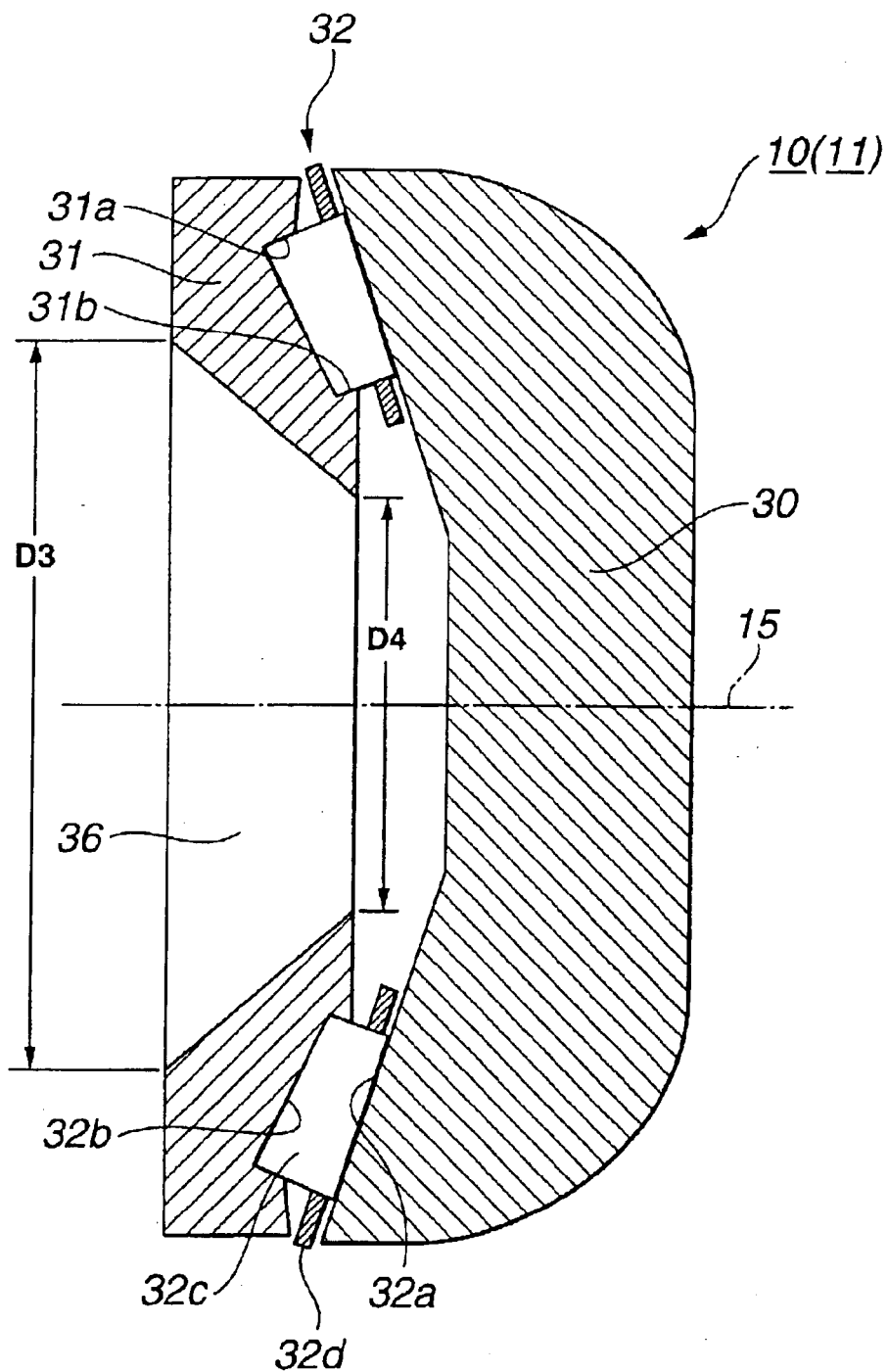
FIG. 10 is a cross section of a power roller incorporated in a toroidal CVT of a third embodiment.

Referring now to FIG. 10, there is shown the detailed cross section of the power roller incorporated in the toroidal CVT of the third embodiment. Outer-race through opening 35 of the power roller of the toroidal CVT of the second embodiment shown in FIG. 9 is formed as a stepped through opening consisting of large-diameter cylindrical-bore portion 35a, small-diameter cylindrical-bore portion 35b, and intermediate tapered through-opening portion 35c. The third embodiment of FIG. 10 is different from the second embodiment of FIG. 9, in that a through opening, centrally formed in outer race 31 of the power roller of the toroidal CVT of the third embodiment is formed as a single tapered through opening 36 that serves as a hollow portion that permits the reasonable deformation of outer race 31 following the deformation of inner race 30, which may occur owing to the applied forces Fc, Fc. As clearly shown in FIG. 10, single tapered through opening 36 has a relatively larger diameter D3 at the left-hand axial opening end facing trunnion 14 and a relatively smaller diameter D4 at the right-hand axial opening end facing inner race 30. Stepped through opening 35 of the second embodiment of FIG. 9 usually requires at least three machining processes for large-diameter and small-diameter cylindrical bores 35a, 35b, and intermediate tapered through opening 35c. Supposing that stepped through opening 35 of the second embodiment of FIG. 9 is constructed by large-diameter and small-diameter cylindrical bores 35a and 35b without intermediate tapered through opening 35c, such a two-stepped through opening of the second embodiment may require at least two machining processes. In contrast, single tapered through opening 36 of the third embodiment of FIG. 10 merely requires one machining for the sole tapered bore. Tapered through opening 36 of the third embodiment is superior in easy machining and increased spatial capacity. As set forth above, the power roller structure of the toroidal CVT of the third embodiment can further provide the following effect (VI) in addition to the previously-discussed effects (I) to (III), obtained by the first and second embodiments.

(VI) The low rigidity structure of outer race 31 is formed as a single tapered through opening 36 having a relatively larger diameter D3 at one axial opening end facing trunnion 14 and a relatively smaller diameter D4 (<D3) at the other axial opening end facing inner race 30. This is advantageous with respect to both the low manufacturing costs of the toroidal CVT and properly increased spatial capacity of the power-roller outer-race through opening.

Figure 11:
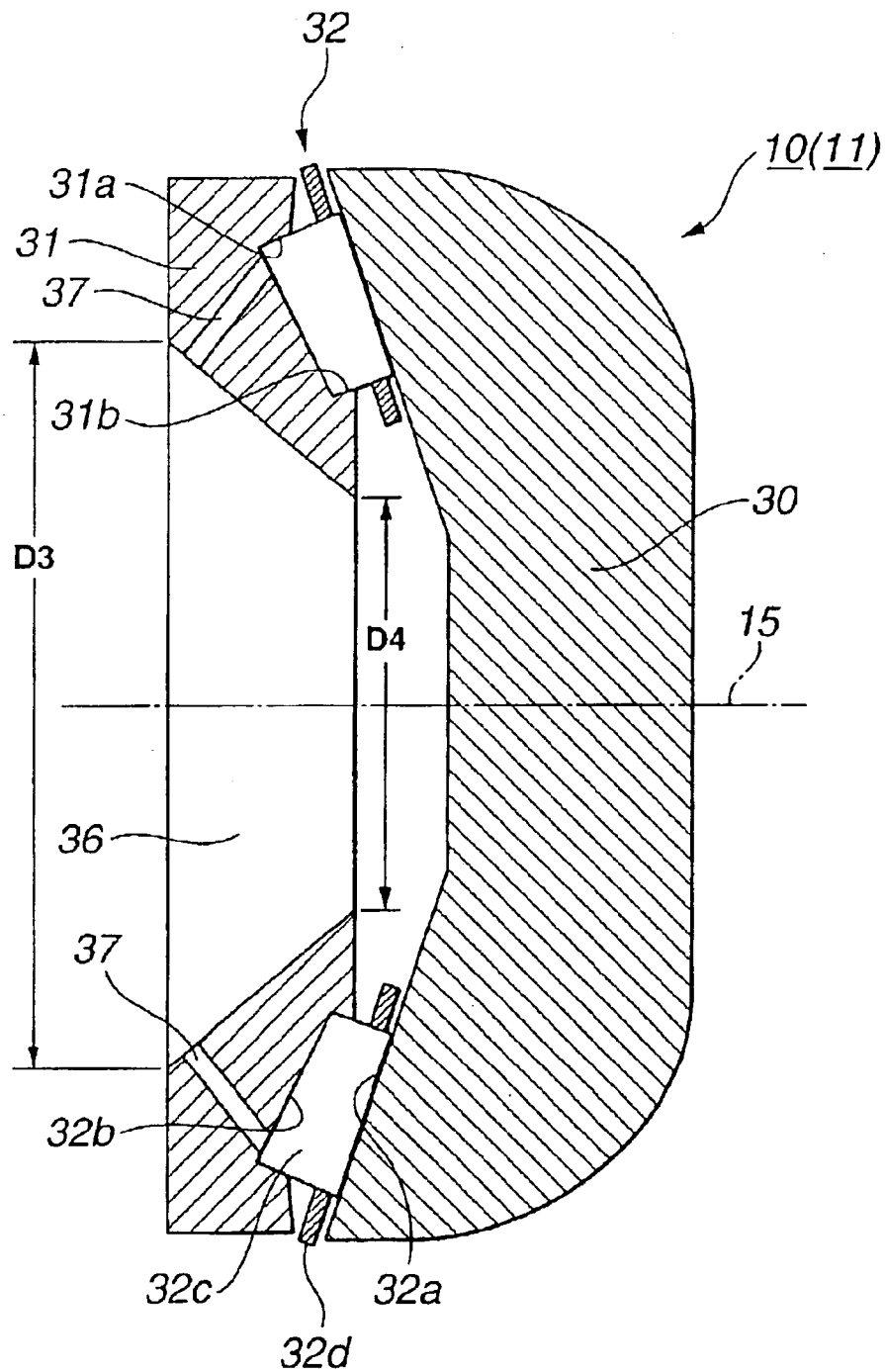
FIG. 11 is a cross section of a power roller incorporated in a toroidal CVT of a fourth embodiment.

Referring now to FIG. 11, there is shown the detailed cross section of the power roller incorporated in the toroidal CVT of the fourth embodiment. The power roller of the toroidal CVT of the fourth embodiment shown in FIG. 11 has almost the same cross section as that of the third embodiment shown in FIG. 10. The power-roller outer race of the fourth embodiment of FIG. 11 is similar to that of the third embodiment of FIG. 10, except that a communicating oil passage 37 is further provided in such a manner as to intercommunicate tapered through opening 36 and outer raceway surface 32b. As can be seen from the cross section of FIG. 11, communicating oil passage 37 is machined or bored in outer race 31, so that the central axis of communicating oil passage 37 is straight and perpendicular to the frusto-conical surface of tapered through opening 36. By way of communicating oil passage 37, tapered through opening 36 and outer raceway surface 32b are intercommunicated so as to supply lubricating oil (traction oil) from taped through opening 36 to outer-race collared portion 31a guiding the outside large-diameter end face of each tapered roller 32c. As may be appreciated, during operation of the toroidal CVT, communicating oil passage 37 prevents undesired seizure between outer-race collared portion 31a and the outside large-diameter end face of each tapered roller 32c, in sliding-contact with each other. Actually, lubricating oil fed from trunnion 14 into tapered through opening 36, is distributed into two lubricating-oil paths, namely a first lubricating-oil path from the relatively larger axial opening end of tapered through opening 36 having larger diameter D3 to communicating oil passage 37, and a second lubricating-oil path from the relatively larger axial opening end of tapered through opening 36 to the relatively smaller axial opening end of tapered through opening 36 having smaller diameter D4. Part of lubricating oil is delivered via first lubricating-oil path to outer-race collared portion 31a. At the same time, the remainder of lubricating oil is delivered via second lubricating-oil path to both of inner and outer raceway surfaces 32a and 32b. Such adequate oil lubrication reliably prevent undesired seizure between outer-race collared portion 31a and the outside large-diameter end face of each tapered roller 32c, and thus insure adequate lubrication of power-roller bearing (tapered roller bearing 32), that is, smooth rotary motion of inner race 30 during operation of the toroidal CVT. In addition to the above, in case of the power roller structure of the fourth embodiment of FIG. 11, in machining communicating oil passage 37 (a straight cylindrical bore), it is possible to easily put a drill top-cutting edge straight on the machining surface (the frusto-conical surface of tapered through opening 36) from the left-hand axial opening end of tapered through opening 36 having the relatively larger diameter D3, such that the axis of straight communicating oil passage 37 is perpendicular to the frusto-conical surface of tapered through opening 36. This reduces the frequency of drill breakage, thus reducing total manufacturing costs. As set forth above, the power roller structure of the toroidal CVT of the fourth embodiment can further provide the following effect (VII) in addition to the previously-discussed effects (I) to (III) obtained by the first, second and third embodiments and the effect (VI) obtained by the third embodiment.

(VII) According to the power roller structure of the fourth embodiment of FIG. 11, communicating oil passage 37 is further provided to intercommunicate outer-race tapered through opening 36 and outer raceway surface 32b. This insures adequate lubrication for power roller bearing (tapered roller bearing 32), that is, smooth rotary motion of inner race 30, thereby reliably preventing undesired seizure between outer-race collared portion 31a and the outside large-diameter end face of each tapered roller 32c. Additionally, by boring or machining the sole tapered through opening 36 in outer race 31, it is possible to easily efficiently machine communicating oil passage 37 whose axis is perpendicular to the frusto-conical surface of tapered through opening 36. A combination of sole tapered through opening 36 and communicating oil passage 37 whose axis is perpendicular to the frusto-conical surface of tapered through opening 36 is advantageous with respect to both of easy machining and reduced manufacturing costs.

Figure 12:
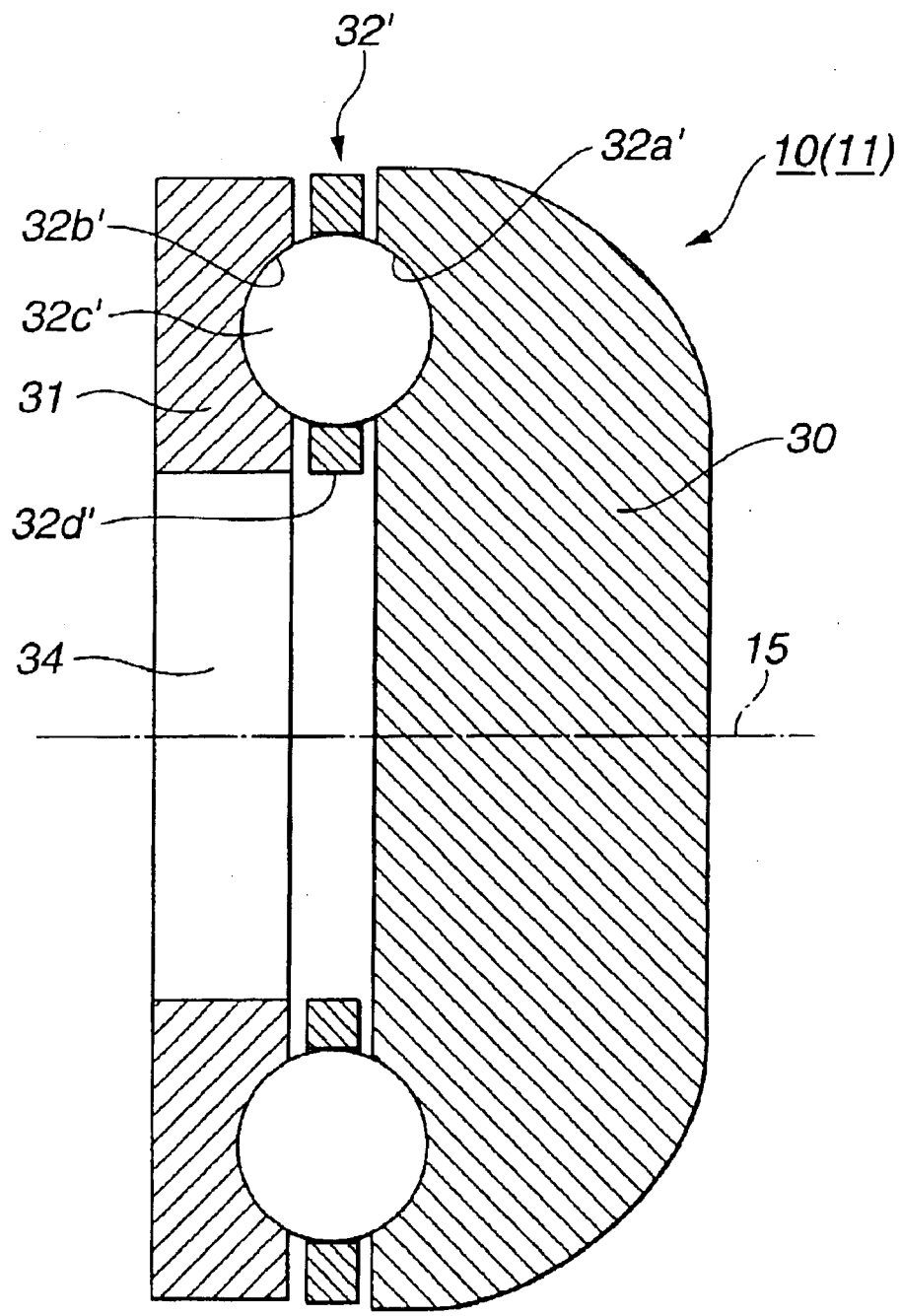
FIG. 12 is a cross section of a power roller incorporated in a toroidal CVT of a fifth embodiment.

Referring now to FIG. 12, there is shown the detailed cross section of the power roller incorporated in the toroidal CVT of the fifth embodiment. The power roller bearing of the toroidal CVT of each of the first, second, third, and fourth embodiments is a tapered roller bearing. On the contrary, the power roller bearing of the toroidal CVT of the fifth embodiment shown in FIG. 12 is a ball bearing 32'. As seen in FIG. 12, ball bearing 32', used for the toroidal CVT of the fifth embodiment, is comprised of an inner raceway surface 32a' formed as an annular recessed curved surface on inner race 30, an outer raceway surface 32b' formed as an annular recessed curved surface on outer race 31, a plurality of balls (rolling elements) 32c' each sandwiched between inner and outer raceway surfaces 32a' and 32b', and a cage 32d' that retains balls 32c' while permitting rotary motion of each ball 32c'. In the same manner as the power roller incorporated in the toroidal CVT of the first embodiment of FIG. 3, outer race 31 of the power roller of the fifth embodiment of FIG. 12 is formed with a through opening (or a central cylindrical bore) 34 that functions as a low rigidity structure. Thus, the power roller structure of the toroidal CVT of the fifth embodiment can provide the same effects (I) to (III) as the first embodiment. That is, by virtue of the low rigidity structure (through opening 34 centrally bored in outer race 31), it is possible to prevent an excessive load from acting on ball bearing 32', thus enhancing the fatigue life of ball bearing 32'. Additionally, through opening 34 is formed as a central cylindrical bore and machining the cylindrical bore is very easy, thus enhancing the productivity of outer race 31 having a properly low rigid structure. Moreover, outer race 31 has the low rigidity structure (through opening 34), whereas inner race 30 has the solid cross section structure by which the radial deformation of inner race 30 can be effectively suppressed even when the shearing force and the contact pressure pair Fc, Fc are applied via input and output disks to inner race 30. By the synergistic effect of the low deformability of inner race 30 and the high deformability of outer race 31, it is possible to effectively prevent the excessive load from being applied to ball bearing 32', thereby increasing the life of the power roller bearing (ball bearing 32').

Figure 13:
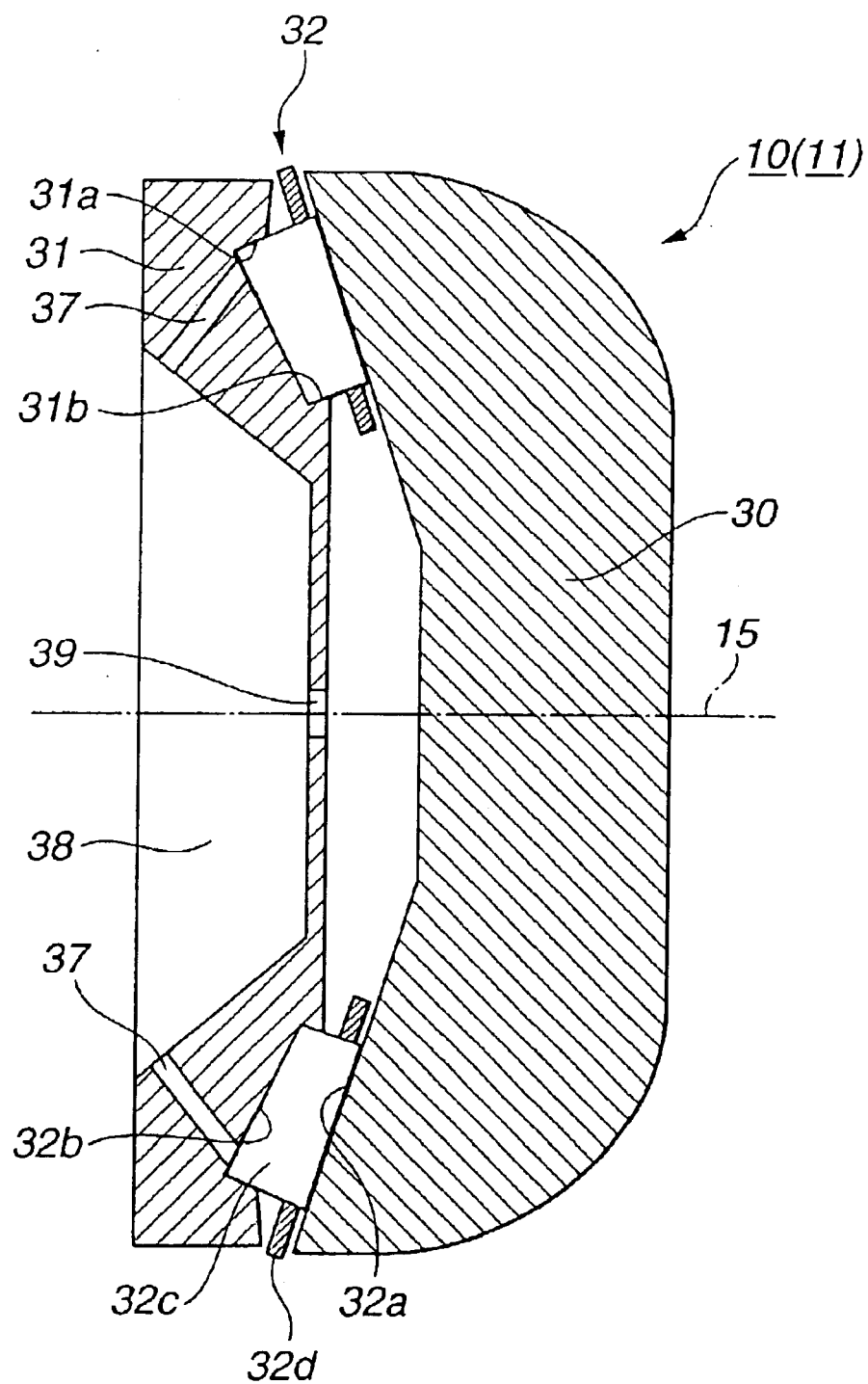
FIG. 13 is a cross section of a power roller incorporated in a toroidal CVT of a sixth embodiment.

Referring now to FIG. 13, there is shown the detailed cross section of the power roller incorporated in the toroidal CVT of the sixth embodiment. As discussed above, the low rigidity structure of outer race 31 of the power roller of the toroidal CVT of the first embodiment shown in FIG. 3 is constructed by a centrally-bored through opening 34. On the other hand, the low rigidity structure of outer race 31 of the power roller of the toroidal CVT of the sixth embodiment shown in FIG. 13 is constructed by a frusto-conical recessed portion 38 having a large-diameter opening at the left-hand axial end (viewing FIG. 13) facing trunnion 14 and closed at the right-hand axial end facing inner race 30. Frusto-conical recessed portion 38 serves as a hollow portion that permits the reasonable deformation of outer race 31 following the deformation of inner race 30, which may occur owing to the applied forces Fc, Fc. An oil hole 39 is bored in the center of the closed end of frusto-conical recessed portion 38, so as to supply lubricating oil from trunnion 14 through frusto-conical recessed portion 38 and central oil hole 39 to an internal space defined between inner and outer races 30 and 31 for satisfactory lubrication for both of inner and outer raceway surfaces 32a and 32b of the power roller bearing (tapered roller bearing 32). As may be appreciated from the above, the power roller structure of the toroidal CVT of the sixth embodiment can further provide the following effect (VIII) in addition to the previously-discussed effects (I) to (III) obtained by the first, second, third fourth and fifth embodiments, the effect (VI) obtained by the third embodiment, and the effect (VII) obtained by the fourth embodiment.

(VIII) According to the power roller structure of the sixth embodiment of FIG. 13, outer race 31 is formed with frusto-conical recessed portion 38 that is located at the position corresponding to the power-roller rotation axis 15 and serves as the low rigidity structure that promotes the deformation of outer race 31 following the deformation of inner race 30, occurring owing to the applied forces Fc, Fc from input and output disks 3 and 8 to inner race 30. Such frusto-conical recessed portion 38, having a large-diameter opening at one axial end and closed at the other axial end, can be easily machined by way of one machining process, using a high Young's modulus material, such as steel. Outer race 31 having the low rigidity structure can be efficiently produced by way of easy machining, thus reducing total manufacturing costs of toroidal CVTs.

The entire contents of Japanese Patent Application No. 2002-123351 (filed Apr. 25, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
   input and output disks coaxially arranged and having respective torus surfaces opposing each other;
   at least one power roller interposed between the opposing torus surfaces of the input and output disks under a preload;
   a trunnion that supports the power roller to permit a tilting motion of the power roller about a trunnion axis perpendicular to a rotation axis of the power roller and to permit a parallel translation of the power roller relative to the trunnion in a direction of a common rotation axis of the input and output disks;
   a loading cam device that produces the preload acting on the power roller through the input and output disks;
   the power roller comprising:
   (i) an inner race kept in contact with the input and output disks under the preload to transmit input torque from the input disk via the inner race to the output disk;
   (ii) an outer race supported by the trunnion; and
   (iii) a power-roller bearing that rotatably supports the inner race while permitting relative rotation of the inner race to the outer race; the power-roller bearing comprising at least an inner raceway surface formed on the inner race, an outer raceway surface formed on the outer race, and a plurality of rolling elements sandwiched between the inner and outer raceway surfaces; and
   the outer race having a low rigidity structure that promotes a deformation of the outer race so that the deformation of the outer race follows a deformation of the inner race, occurring due to the preload acting on the inner race of the power roller through the input and output disks.

2. The toroidal continuously variable transmission as claimed in claim 1, wherein:
   the low rigidity structure comprises a hollow portion that is located at a position corresponding to the rotation axis of the power roller to permit the deformation of the outer race following the deformation of the inner race, occurring due to the preload acting on the inner race of the power roller through the input and output disks.

3. The toroidal continuously variable transmission as claimed in claim 2, wherein:
   the hollow portion comprises a through opening, centrally bored in the outer race at the position corresponding to the rotation axis of the power roller.

4. The toroidal continuously variable transmission as claimed in claim 1, wherein:

the inner race has a solid cross section structure that suppresses the deformation of the inner race, occurring due to the preload acting on the inner race of the power roller through the input and output disks.

5. The toroidal continuously variable transmission as claimed in claim 3, wherein:

the through opening comprises a stepped through opening comprising:
(i) a large-diameter through-opening portion that faces the trunnion and has a first diameter; and
(ii) a small-diameter through-opening portion that faces the inner race, and is located adjacent to the large-diameter through-opening portion, and has a second diameter relatively smaller than the first diameter.

6. The toroidal continuously variable transmission as claimed in claim 3, wherein:

the through opening comprises a stepped through opening comprising:
(i) a large-diameter through-opening portion that faces the trunnion and has a first diameter;
(ii) a small-diameter through-opening portion that faces the inner race and has a second diameter relatively smaller than the first diameter; and
(iii) an intermediate tapered through-opening portion by which the large-diameter through-opening portion and the small-diameter through-opening portion are interconnected.

7. The toroidal continuously variable transmission as claimed in claim 3, wherein:

the through opening comprises a single tapered through opening having a relatively larger diameter at one axial end facing the trunnion and a relatively smaller diameter at the other axial end facing the inner race.

8. The toroidal continuously variable transmission as claimed in claim 1, further comprising:

a communicating oil passage that is formed in the outer race to intercommunicate the through opening and the outer raceway surface.

9. The toroidal continuously variable transmission as claimed in claim 2, wherein:

the hollow portion comprises a recessed portion, centrally bored in the outer race at the position corresponding to the rotation axis of the power roller, having a large-diameter opening at one axial end facing the trunnion, and being closed at the other axial end facing the inner race.

10. The toroidal continuously variable transmission as claimed in claim 1, further comprising:

a linear bearing unit disposed between the outer race and the trunnion to permit the parallel translation of the outer race of the power roller relative to the trunnion in the direction of the common rotation axis of the input and output disks.

11. The toroidal continuously variable transmission as claimed in claim 10, wherein:

the linear bearing unit comprises a pair of thrust bearings laid out symmetrically with respect to the rotation axis of the power roller so that the thrust bearings are equi-distant spaced to each other;

the trunnion has a substantially C-shaped power-roller accommodating portion whose corners have respective inclined power-roller supporting faces having the same inclined angle and but different sense; and the thrust bearings are attached onto the respective inclined power-roller supporting faces.

* * * * *